Patented July 7, 1942

2,289,184

UNITED STATES PATENT OFFICE 2,289,184

TREATMENT OF RUBBER

Harry L. Fisher, Stamford, Conn., assignor to United States Rubber Company, New York, N. Y., a corporation of New Jersey No Drawing. Application July 11, 1939, Serial No. 283,830

8 Claims. (Cl. 260—768)

This case is a continuation in part of case Serial No. 728,311, filed May 31, 1934, (now Patent No. 2,170,191, dated Aug. 22, 1939).

This invention relates to the treatment of rubber and similar vulcanizable materials, and more particularly to methods of improving the properties thereof, and the resulting products.

An object of the invention is to provide a class of new rubber derivatives. Another object is to provide a new class of vulcanizing agents, that is, a class of compounds which are capable of vulcanizing rubber to a condition similar to that hitherto obtained by using sulphur as the vulcanizing means. Further objects will be apparent from the following description.

The invention broadly comprises treating rubber prior to vulcanizing with a quinone haloimine having the general formula Y=Q=N—X where Q is an ortho- or a para-quinonoid nucleus of the benzene or naphthalene series; X is halogen; Y is any divalent radical. Preferred examples of Y include O=, =N—halogen, and imine residues such as =N—hydrocarbon wherein the hydrocarbon group may be aryl, aralkyl, alkyl or arylene.

In addition the quinone nucleus, Q, may have as further substituents such groups as alkyl, aryl, halogen, hydroxyl, alkoxyl, amino, alkylamino, dialkylamino, aralkylamino, or arylamino.

In general, the time required to effect vulcanization is comparable with that required when vulcanizing by means of sulphur and organic accelerators.

The property of vulcanizing rubber is enhanced if an oxidizing agent is employed with the compounds, although not all of them require the presence of an oxidizing agent for good results.

Illustrative examples of compounds of the present invention are p-quinone-mono-chlorimine, p-quinone-mono-bromimine, 2,6-dichloro-p-quinone-4-mono-chlorimine, p-quinone-N-chloro-N'-phenyl-diimine, p-quinone-N-chloro-N'-cyclohexyl-diimine, p-quinone-bis-chlorimine, p-quinone-bis-bromimine, o-quinone-bis-chlorimine, toluquinone-bis-chlorimines, xyloquinone-bis-chlorimines, alpha and beta naphthoquinone-mono-chlorimines, alpha and beta naphthoquinone-bis-chlorimines, p-diphenoquinone-bis-chlorimine. The last named compound has the structure

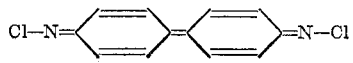

Results with the new vulcanizing agents are demonstrated by the following tests:

| Vulcanizing agents, etc. in 100 parts rubber (pale crepe) | Parts by weight | Minutes of press cure (at 141° C.) | T Kg./cm.² | E Kg./cm.² |
|---|---|---|---|---|
| 2,6-dichloro-p-quinone-4-mono-chlorimine | 5 | 15<br>30<br>60 | 8<br>77<br>63 | 320<br>720<br>690 |
| 2,6-dichloro-p-quinone-4-mono-chlorimine<br>Lead dioxide | 1<br>2 | 15<br>30<br>60 | 71<br>76.5<br>75 | 740<br>740<br>520 |
| p-Quinone-bis-chlorimine | 4 | 15<br>30<br>60 | 45<br>17.5<br>13.4 | 620<br>430<br>380 |

T is tensile strength, and E percent elongation at break.

Wherever the term aryl, aralkyl, alkyl or arylen occurs herein, it is to be understood unless otherwise specified as meaning either the unsubstituted groups, or substituted hydrocarbon groups such as those that contain substituents such as hydroxy, alkoxy, acidyl, halogen, amino radicals, etc.

It is further to be understood that the terms "quinonoid nucleus," "benzene series," "aryl," "arylene" comprehend groups containing two distinct but directly connected benzene rings, e. g., groups derived from biphenyl, and that the term "alkyl" includes saturated and unsaturated monovalent radicals of the aliphatic and the alicyclic series.

The amounts of the respective vulcanizing agent usable ordinarily vary from about 1 to about 5 parts by weight based on 100 parts of rubber, less being required when used in conjunction with an inorganic oxidizing agent than when the latter is not used. Instead of using a single vulcanizing agent, mixtures of the same may be used.

The amounts of the respective oxidizing agents, when such are used with the vulcanizing agents in rubber, may vary from about 1 to about 10 parts and higher by weight per 100 parts by weight of rubber. These proportions are but illustrative, and may be varied according to the type of rubber and compounding ingredients in order to obtain the optimum cure in each case. Instead of using a single oxidizing agent, mixtures of the same may be used.

As mentioned, the use of an oxidizing agent is not required in all cases, but where it is used it gives a vulcanizate which is stronger and has other improved qualities, and generally allows of the use of a lesser amount of the organic vulcanizing agent and/or reduces the time of vulcanization.

The preferred oxidizing agents are those containing oxygen and a multivalent metal, in which the metal is in a higher state of oxidation; for example, lead dioxide, manganese dioxide, mercuric oxide (preferably yellow), lead chromate, vanadium pentoxide, and the like. In some cases the mix may be set aside in powdered oxidizing agent for several days to vulcanize at room temperature.

The use of an oxidizing agent is not to be confused with the use of those basic oxides or amines which are not recognized to be oxidizing agents for organic compounds, e. g., zinc oxide, magnesium oxide, calcium hydroxide, urea and its derivatives.

The new vulcanized products, like rubber-sulphur vulcanizates, are characterized, as distinguished from raw rubber, by a low permanent set, increased tensile strength, reduced elongation at break, substantial insolubility in the common rubber solvents (e. g. gasoline, benzene, solvent naphtha, chloroform, etc.), and retention of elastic properties at lower temperatures. Examples of various products are, high carbon black stocks such as tire tread compositions, vibration-absorbing elements such as motor mountings and the like, tubes, hose, belting, packing, dipped rubber articles, thread uncovered or covered with yarn, threads or filaments such as cotton, silk, wool, etc., rubber coated fabrics, gaiters and other composite rubber and fabric articles and goods, associated or not with metals. The sulphur tarnish on metals associated with rubber, such as occurs where sulphur is used as the vulcanizing agent, may be avoided by the use of this invention.

The rubber compounds may be mechanically processed to any desired form or shape, as by calendering, molding, tubing, extruding, etc. Latex whether of natural origin or artificially prepared from crude rubber, to which the chemicals are added, may be spread, extruded or otherwise treated, before, during or after vulcanization to provide vulcanized rubber articles, coatings, filaments or threads. In compounding or vulcanizing latex with the new vulcanizing agents, the practices employed where sulphur is the vulcanizing agent, may be followed.

The chemicals may be applied for the vulcanization of natural rubbers and artificially prepared rubbers which are adaptable to vulcanization with sulphur, including reclaims and latices of such rubbers.

Various methods of cure may be used with the invention, e. g., mold, press, soapstone, water, steam and air cures.

It is to be understood, that the invention is not to be limited by any theories or statements advanced by way of explanation, and that various modifications will occur to those skilled in the art in the manner of procedure and proportions of materials, for example while the vulcanizing agents of this invention are intended to displace the use of sulphur it may be desirable in some cases to use sulphur or other known vulcanizing agents therewith—all without departing from the spirit of the invention and the scope of the appended claims.

Having thus described my invention, what I claim and desire to protect by Letters Patent is:

1. A process of producing vulcanized rubber which comprises effecting vulcanization of the rubber by means of a quinone-N-halo-imine.

2. A process of producing vulcanized rubber which comprises effecting vulcanization of the rubber by means of a quinone-mono-N-halo-imine.

3. A process of producing vulcanized rubber which comprises effecting vulcanization of the rubber by means of a quinone-mono-N-chloro-imine.

4. A process of producing vulcanized rubber which comprises effecting vulcanization of the rubber by means of a quinone-bis-N-halo-imine.

5. A process of producing vulcanized rubber which comprises effecting vulcanization of the rubber by means of a quinone-bis-N-chloro-imine.

6. A rubber composition having incorporated therein a quinone-N-halo-imine.

7. A rubber composition having incorporated therein a quinone-mono-N-halo-imine.

8. A rubber composition having incorporated therein a quinone-bis-N-halo-imine.

HARRY L. FISHER.